United States Patent [19]

Harlan

[11] 3,778,069

[45] Dec. 11, 1973

[54] MODE SELECTOR DISENGAGE MECHANISM

[75] Inventor: Alfred R. Harlan, Glendale Heights, Ill.

[73] Assignee: Motorola, Inc., Franklin Park, Ill.

[22] Filed: Dec. 6, 1971

[21] Appl. No.: 205,230

[52] U.S. Cl............ 274/4 C, 179/100.2 Z, 274/4 D
[51] Int. Cl........................ G11b 15/10, G11b 15/18
[58] Field of Search..................... 274/4 B, 4 C, 4 E, 274/4 D, 11 B, 11 C, 11 E, 11 D; 179/100.2 Z

[56] References Cited

UNITED STATES PATENTS 3,488,058 1/1970 Staar .................................. 274/4 E
3,632,113 1/1972 Nakamura .......................... 274/4 D

*Primary Examiner*—Louis R. Prince
*Assistant Examiner*—A. Jason Mirabito
*Attorney*—Vincent J. Rauner et al.

[57] ABSTRACT

A mode selector disengage mechanism for a cassette tape player-recorder is operable to remove the player-recorder from a record mode and to actuate a cassette eject mechanism upon operation of a fast forward-reverse tape drive control. A pivotal interlock arm is engageable with a cam member on the mode selector control. Depression of the mode selector control against the force of a biasing spring causes the engagement of the interlock arm and cam member, the former thereby capturing the latter to hold the mode selector control in a record condition. The cam member likewise operates a snap-switch to complete a circuit to a holding coil for the cassette eject mechanism. A second cam member coupled to the interlock arm and the fast forward-reverse drive control pivots the interlock arm to release the first-mentioned cam member upon movement of the last-mentioned drive control to either of the fast forward or reverse positions. The biasing spring in response thereto, moves the mode selector control to a non-record condition, whereby the snap-switch is unoperated to release the holding coil, thereby permitting the eject mechanism to eject the cassette from the player-recorder.

10 Claims, 7 Drawing Figures

MODE SELECTOR DISENGAGE MECHANISM

BACKGROUND

This invention relates generally to cassette type tape player-recorders and more particularly to apparatus for changing the mode of operation of such cassette player-recorders.

In cassette type tape player-recorders equipped with fast forward and reverse mechanisms for use in the playback mode of operation, there may occur a time when the mechanism is actuated while the cassette player-recorder is in the record mode. If the latter should occur the recording tape could be damaged, and, in the case wherein the recorded information cannot be duplicated, it may be lost forever.

SUMMARY

Accordingly, it is a primary object of the present invention to provide in a cassette tape player-recorder of the type described, a mechanism for preventing the above-described occurrence.

It is a further object of the invention to provide an improved mechanism for disengaging the mode selector of a cassette type tape player-recorder from a record mode of operation in the event the fast forward or reverse mechanism thereof is operated while in such mode of operation.

It is another object of the present invention to provide a disengage mechanism of the above described type which is relatively simple in construction and efficient in operation.

Briefly, a preferred embodiment of a disengage mechanism for removing a cassette tape player-recorder from the record mode of operation in the event the fast forward or reverse mechanism incorporated therein is operated, includes a pivotal interlock arm engageable with the raised peripheral edge portion of a cam member mounted on the mode selector shaft of the player-recorder. Upon depression of the selector shaft inwardly of the cassette player-recorder against the force of a coil spring biasing the selector shaft outwardly into a non-record position, the interlock arm engages and captures the cam member. The cam member likewise engages a snap-switch actuator to complete a circuit to a solenoid or holding coil for the cassette eject mechanism.

A reset pin extending downwardly from the interlock arm is normally in a neutral position in the V-shaped cutout of a second cam member which is movable in opposite directions in accordance with the movement of a fast forward-reverse lever into one or the other of the two settings, respectively. Movement of the last-mentioned lever causes the second cam member to engage the reset pin at one or the other of the cam surfaces forming the V-shaped cut-out to in turn pivot the interlock arm, thereby releasing the first-mentioned cam member mounted on the mode selector shaft. Release of the cam member permits the biasing spring to return the mode selector to a non-record position. The snap-switch is thereby de-energized to break the circuit to the holding coil, releasing the latter to permit ejection of a cassette received in the player-recorder, to prevent a loss of information on the tape and/or destruction of the tape itself.

DESCRIPTION OF THE DRAWINGS

In the drawings:

FIG. 2 is an enlarged, exploded, perspective view of the record mode disengage mechanism according to the invention;

DETAILED DESCRIPTION

Figure 1:
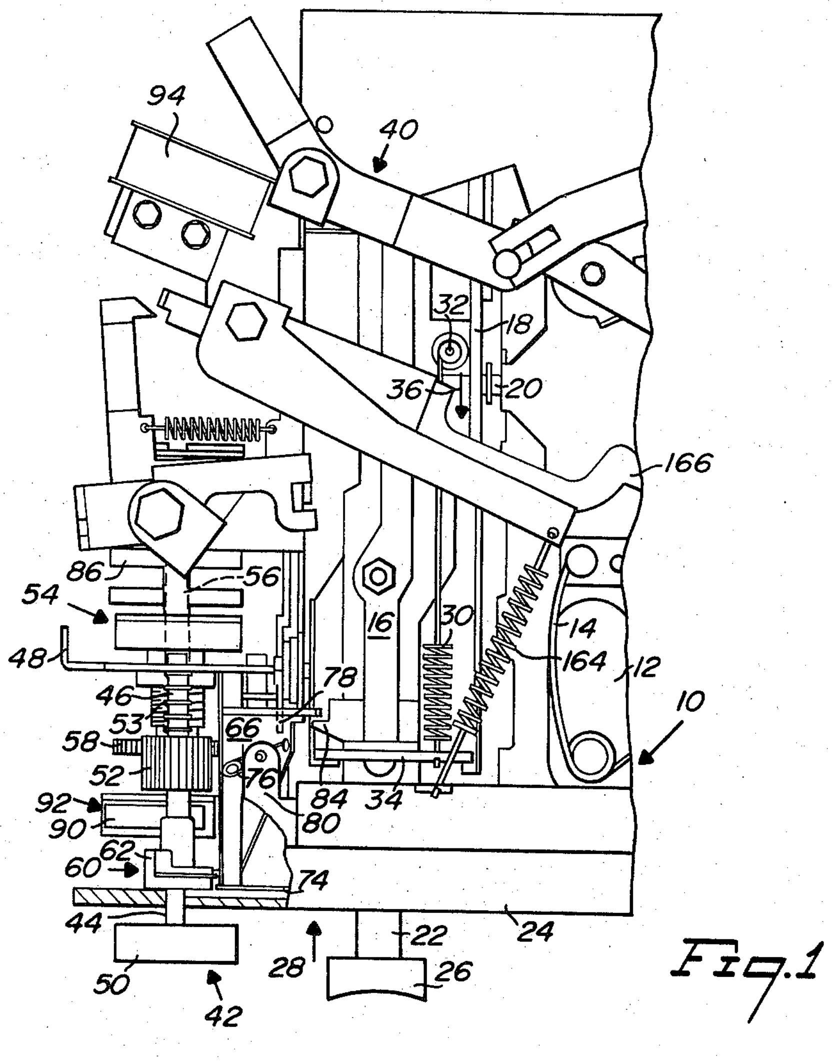
FIG. 1 is a fragmentary, top, plan view of a cassette type tape-recorder in which a record mode disengage mechanism according to the invention is incorporated.

Referring now to the drawings in greater detail, wherein like numerals have been employed to designate similar parts throughout the various views, there is illustrated in FIG. 1 a cassette type tape player-recorder designated generally by the numeral 10 and incorporating therein a record disengage mechanism according to the invention.

The cassette player-recorder is of a conventional design including a cassette or cartridge receiving tunnel 11 (FIG. 3) in which there is mounted a carriage 12. A cassette inserted into the tunnel and received by cartridge 12 is drawn into the latter by the action of an overcenter spring 14. An actuator bar 16 is provided adjacent carriage 12 and is coupled thereto by an actuator arm 18 into which a pin 20 extending from the carriage, is inserted. A free end 22 of the actuator bar extends outwardly through the front plate 24 of the player-recorder and includes a knob 26 thereon. Depression of the knob in the direction of arrow 28 against the force of a return spring 30 connected to bar 16 at pin 32 and to a stationary tab 34 extending upwardly from the internal structure of the player-recorder, causes arm 18 to move in the opposite direction, indicated by arrow 36, to drop carriage 12 downwardly (into the page as seen in FIG. 1) to an operable position on tape driving spindles (not shown). In addition, a magnetic tape head (not shown) for recording and/or playing back information on the tape is moved toward the tape cassette for engagement with the magnetic tape therein.

The actuator bar is returned to its initial position by coil spring 30, leaving actuator arm 18 and carriage 12 in the operated and lowered positions, respectively. A second depression of actuator bar 16 moves actuator arm 18 in the direction opposite arrow 36 and returns carriage 12 to the initial position.

Other instrumentalities, designated generally by the numeral 40 for ejecting a cassette from the player-recorder when power thereto is removed, etc., are provided. A detailed description of the latter will not be provided herein. For a description of the last-mentioned instrumentalities as well as a tape player device similar to the one described herein, see co-pending U.S. patent application, Ser. No. 158,752, entitled "Automatic Eject Mechanism for Cassette Tape Player" in the name of Alfred R. Harlan and assigned to the same assignee as the instant invention.

The cassette player-recorder 10 further includes a mode selector control designated generally by the numeral 42. The control comprises a shaft 44 extending outwardly from the player-recorder through front plate 24. The opposite end 46 of the shaft is mounted for rotation in a support plate 48 extending outwardly from the side of player-recorder 10 parallel to front plate 24. A control knob 50 is provided on the outwardly extending end of shaft 44 for making manual adjustments. A gear member 52 is mounted on the shaft 44 for rotation therewith, and a coil spring member 53 is also mounted on the shaft and is held between plate 48 and gear member 52 to bias the control knob normally outwardly.

Mounted on plate 48 beneath the control shaft 44 is a rotary switch 54. A central wiper shaft 56 shown in dotted lines in FIG. 1, extends through plate 48 and a circular gear 58 is mounted on the end thereof in meshing engagement with gear 52 on mode control shaft 44. The rotary switch changes electrically the mode of operation of the instrumentalities in the tape player-recorder for recording and/or playing back information on a tape cassette received therein.

A generally cylindrical cam member 60 (See FIG. 2) is also mounted on shaft 44 for rotation therewith. The cam member 60 includes a radially outwardly extending lobe 62, which, as will be explained in greater detail hereinafter, permits depression of actuator bar 22 when the mode selector is rotated to a playback position. The cam member further includes a "lip" or edge 64 formed about the periphery thereof.

An interlock arm 66 (See FIGS. 2, 4–6) is mounted adjacent the cam member 60. Interlock arm 66 includes a first cylindrical portion 68 from which there extends a projection 70 positioned for engagement with lobe 62 of cam member 60. A pin 72 extends axially through the cylindrical portion 68 of the arm 66 and is received in plate 48 and a second mounting plate 74 (FIG. 1) positioned in parallel alignment with and adjacent front plate 24. The interlock arm is pivotal on pin 72 and is resiliently biased downwardly (into the page as seen in FIG. 1) by means of a baising spring 76 coupled to an extension portion 78 of the interlock arm extending in the opposite direction from projection 70, and to a stationary plate 80 mounted thereabove.

The mode control selector 42 is movable to at least three different positions to program the tape player-recorder to playback, record-ready, and record conditions.

Figures 4, 5, 6, 7:
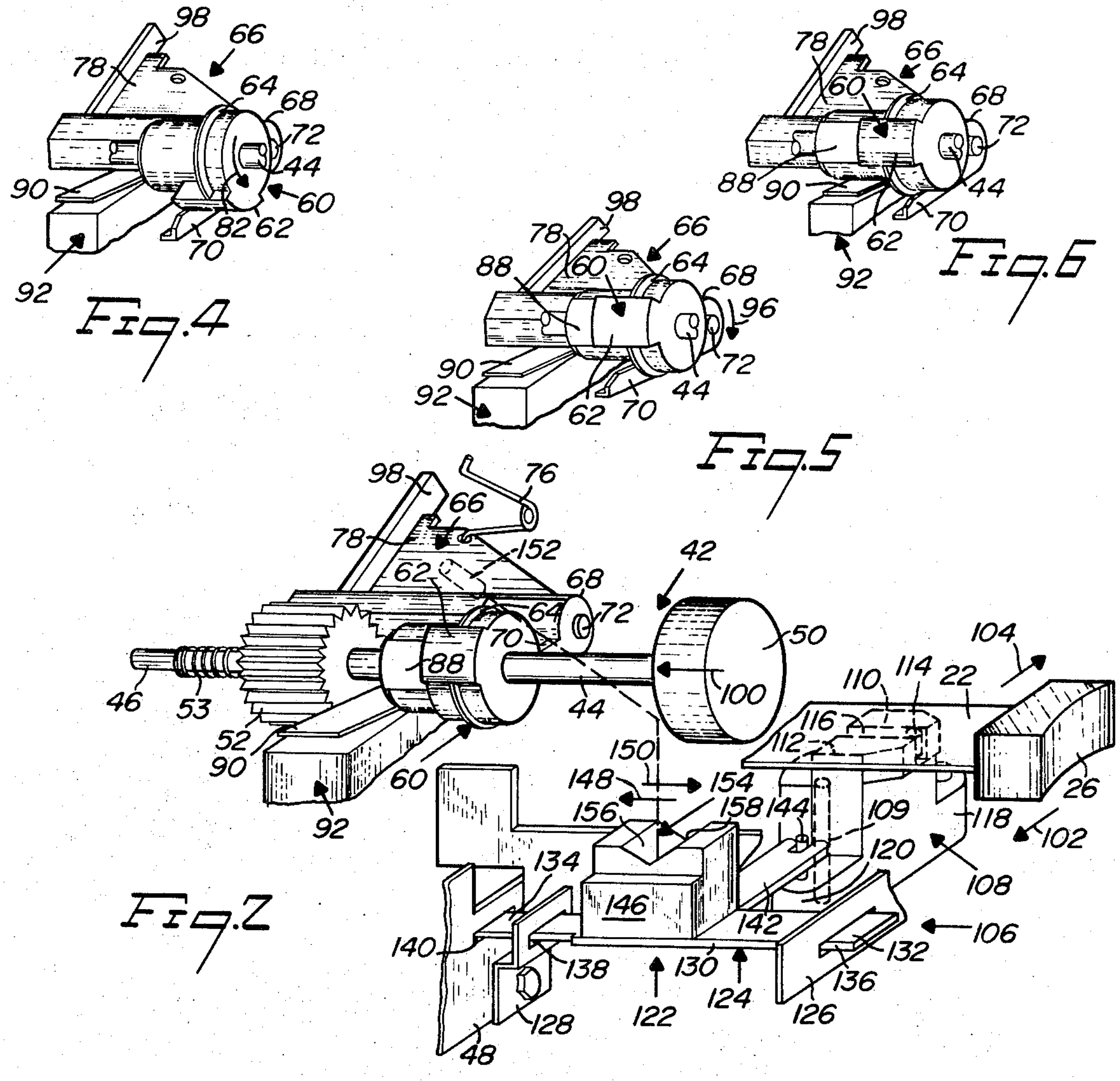
FIGS. 4–6 are perspective views of the cam and interlock arm members employed in the disengage mechanism according to the invention, illustrating the relative positions thereof in playback, record-ready, and record modes of operation.
Figure 3:
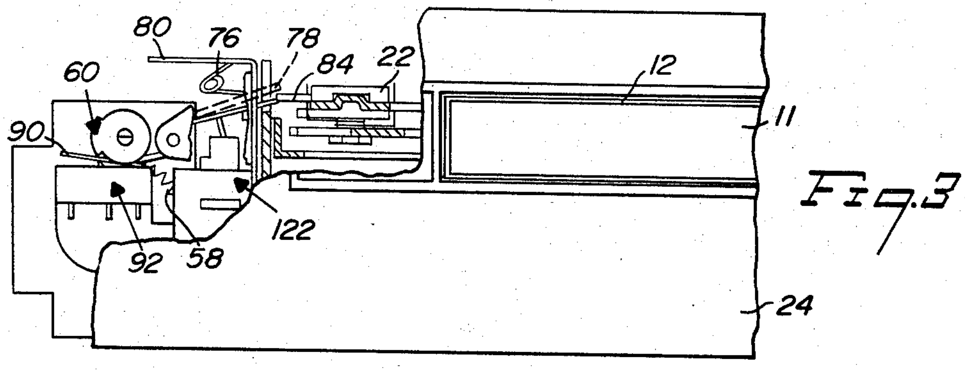
FIG. 3 is a front, cutaway view of the cassette player-recorder of FIG. 1.

The three positions are illustrated in FIGS. 4–6. Referring to FIG. 4, the cam member 60 is shown rotated to a playback position. In this position, the control mode knob 50 is turned in the direction of arrow 82 so that lobe 62 engages projection 70 of interlock arm 66 pivoting the last-mentioned arm in the same direction so that the extension portion 78 thereof is moved into a position shown in dotted lines in FIG. 3, out of the path of a projection 84 extending from actuator bar 22. Likewise, the wiper shaft 56 of rotary switch 54 is positioned to cause wipers (not shown) mounted thereon to make electrical contact with the various terminals on wafers, such as 86, to place the tape player-recorder instrumentalities electrically into the playback condition. With extension 78 lifted as shown in FIG. 3, the actuator arm 22 is free to be depressed inwardly of player-recorder 10 for lowering a cassette receivd in carriage 12 onto the drive spindles to received back information recorded thereon.

Figure 7:
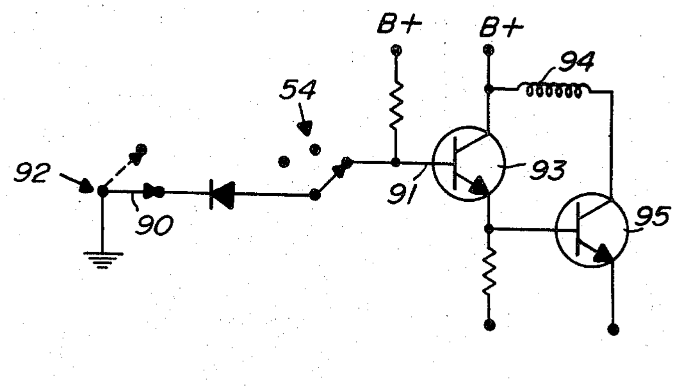
FIG. 7 is a schematic diagram of an actuating circuit for a cartridge eject solenoid incorporated in the player-recorder.

A flattened area 88 of the cam member 60 adjacent lobe 62 becomes aligned with the actuator arm 90 of a snap-switch 92 mounted therebeneath. The snap-switch when energized by depression of actuator 90 (into the page as seen in FIG. 1) completes an electrical circuit for use in the record mode of operation to enable the energization of solenoid 94 of the cartridge eject mechanism, thereby to permit operation of the player-recorder in the record mode (See FIG. 7). The circuit of FIG. 7 will be explained in greater detail hereinafter. In the event the control knob 50 is depressed inadvertently while in the playback position, the flattened portion avoids actuation of the snap-switch.

Rotation of knob 50 in the direction opposite from arrow 82 (FIG. 4) takes the mode control selector out of the playback position and places it into a record-ready position (See FIG. 5). In the latter position, lobe 62 is disengaged from projection 70 of the interlock arm, permitting the last-mentioned arm to be pivoted in the direction of arrow 96 (FIG. 5) by spring 76, whereby arm 98 of extension portion 78 is moved into the path of projection 84 on actuator bar 22 to prevent movement inwardly of the bar. Snap-switch 92 likewise is not operated when the mode selector control is in the record-ready condition.

To place the player-recorder 10 in the record mode, knob 50 is depressed in the direction of arrow 100 (FIG. 2) to move shaft 44 inwardly. When moved inwardly as described, against the force of spring 53, peripheral lip 64 of the cam member 60 engages projection 70 to rotate the interlock arm so that arm 98 is once again positioned out of the path of actuator bar 22. Depression of knob 50 further causes cam member 60 to engage the actuator arm 90 of snap-switch 92 to complete the enable circuit for solenoid 94 of the cartridge eject mechanism. Lip 64 captures interlock arm 66 in the last-mentioned position. Actuator bar 22 now may be depressed to drop cartridge 12 into the operating position. As will be seen in FIG. 7, engagement of actuator arm 90 by cam member 60, moves the arm 90 from a normal position (solid lines) whereat a ground potential is placed on the base electrode 91 of a transistor 93 connected in an emitter follower configuration and driving a second transistor 95 which in turn drives solenoid 94 of the cartridge eject mechanism 40. When actuator arm 90 is moved to the position shown in dotted lines, by engagement of cam member 60 therewith, the ground potential is removed from the base 91 of transistor 93 enabling the circuit for operation of solenoid or holding coil 94. It should be noted that rotary switch 54 is also included in the circuit and must be positioned in the record-ready condition to complete the circuit between the snap-switch 92 and the eject mechanism solenoid. In the case wherein the rotary switch is positioned for playback, the eject mechanism solenoid or holidng coil 94 is enabled through other circuitry (not shown) which does not include snap-switch 92.

In the particular tape player-recorder embodiment 10 shown herein, a fast forward and reverse speed mechanism for driving the tape in a cassette received in the player-recorder is included. To actuate the last-mentioned mechanism (not shown), actuator bar 22 is moved to the left or right, in the direction of arrows 102, 104, respectively. The latter movement changes mechanically the direction and speed of the tape driving instrumentalities of the player-recorder. The fast forward and reverse mechanism is for use when the player-recorder is in the playback mode. If it is attempted to be used while the player-recorder is in the record mode, damage to the tape may occur as well as a possible loss of information recorded thereon. To prevent the latter, a mechanism 106 has been provided to disengage the mode selector and to break the circuit to the solenoid 94 of the cartridge eject mechanism 40 through snap-switch 92, thereby causing the ejection of the cassette from the player-recorder.

The disengage mechanism 106 includes a fast forward and reverse actuating cam 108 mounted on the base plate (not shown) of the player-recorder on a pin 109 extending through the center thereof, for pivotal movement thereabout (see FIG. 2).

Cam 108, which is preferably formed of an integrally molded piece of nylon or plastic material, includes along the top thereof a pair of spaced blocks, 110, 112. A pin 114 extending downwardly from actuator bar 22 is received in the channel 116 formed between the blocks. When depressing actuator bar 22 is described heretofore, the pin slides freely between the blocks without disturbing cam 108. Movement of the actuator bar in the direction of arrows 102, 104 however, causes pin 114 to engage one or the other of the blocks to pivot cam 108 about pin 109 upon which the cam is mounted.

A pair of ears 118, 120 extend from opposite sides of the cam 108. Cam 108 is connected mechanically at ear 118 to a mechanism (not shown) which alters the direction and speed of the tape drive instrumentalities of the tape player-recorder, so that movement of actuator arm 22 in one direction (arrow 102) causes the tape to be driven at a fast forward speed and movement in the opposite direction (arrow 104) causes the tape to be driven at a fast reverse speed.

Connected to the opposite ear 120 of the cam 108 is a disengage cam assembly 122. The disengage cam assembly 122 includes a frame portion 124 comprising first and second parallel, spaced mounting brackets 126, 128, the latter of which is bolted onto plate 48.

A T-shaped plate 130 is mounted at the ends 132, 134 thereof in apertures 136, 138 in mounting brackets 126,128, respectively. End 134 of the plate also extends through an aperture 140 in plate 48 aligned with the last-mentioned apertures. The end 142 of the third leg of the T-shaped plate is attached pivotally by pin 144 to the ear 120 of cam 108.

A fast forward and disengage cam 146 is mounted on T-shaped plate 130 for movement therewith in the direction of arrows 148, 150 in accordance with the movement of actuator bar 22. The last-mentioned cam 146 has a V-shaped cut-out 154 formed along a top wall thereof and a pin member 152 extending downwardly from extension portion 78 of interlock arm 66 is received in the cut-out.

In operation, mode selector knob 50 is first rotated to the record-ready condition. Then knob 50 is depressed in the direction of arrow 100 (FIG. 2) to place the mode selector in the record condition. Depression of knob 50 as described, moves cam member 60 into engagement with projection 70 of interlock arm 66 to move the last-mentioned arm out of the path of actuator bar 22 and to caputre cam member 60 at peripheral edge 64 thereof. In addition, cam member 60 engages and moves snap-switch actuator 90 to the position shown in dotted lines in FIG. 7, thereby operating the microswitch to permit operation of eject solenoid or holding coil 94.

After a cassette is received in the carriage 12, actuator bar 22 is depressed to lower the carriage and cassette into an operational position for recording information on the tape mounted in the cassette. Once actuator bar 22 is depressed, solenoid 94 holds the cassette eject mechanism in a ready condition for ejecting the cassette from the player-recorder.

If, during the recording period the actuator bar 22 should be moved in the directions of arrows 102 and 104, pin 114 causes cam 108 to be pivoted. Movement of actuator bar 22 in the direction of arrow 102 causes the T-shaped slide plate 124 and disengage cam 146 to be moved in the direction of arrow 148 and movement of the actuator bar in the direction of arrow 104 causes the slide plate and cam to be moved in the direction of arrow 150. In either event, one or the other of the walls 156, 158 forming the V-shaped cut-out 154, engages pin 152 to rotate interlock arm 66 in a counterclockwise direction as seen in FIG. 2, to momentarily disengage projection 70 and peripheral lip 64 of the cam member 60. Disengagement of lip 64 frees mode selector 42. The latter is thereby propelled outwardly of the tape player-recorder 10 in a direction opposite from arrow 100, by the action of spring 53. When moved outwardly, arm 90 of snap-siwtch 92 is moved to the position in solid lines in FIG. 7 to open the circuit to the eject holding coil or solenoid 94. Release of solenoid 94 causes the cassette inserted into the player-recorder to be automatically ejected by the force of spring 164 connected to the cartridge eject arm 166 of the cartridge eject mechanism 40. As mentioned heretofore, a detailed description of the eject mechanism 40 shown herein is given in co-pending U.S. patent application, Ser. No. 158,752, assigned to the same assignee as the instant invention. With the mode selector in the released position, the tape player-recorder is placed in a record-ready condition; i.e., electrically the instrumentalities are in a record condition, but a cassette will not be maintained within the player-recorder because of the deactuation of snap-switch 92.

Thus, the disengage mechanism according to the invention prevents damage to a tape and/or loss of recorded information on the tape in a cassette inserted into the tape player-recorder in the event the fast forward or reverse speed control mechanism is operated while the tape player-recorder mode selector is in the record mode.

While a particular embodiment of the invention has been shown and described, it should be understood that the invention is not limited thereto since many modifications may be made. It is therefore contemplated to cover by the present application any and all such modifications as fall within the true spirit and scope of the appended claims.

I claim:

1. A tape player-recorder adapted to receive a cassette for recording and playing back information on a tape therein, including in combination; means for receiving said cassette, tape playing and recording instrumentalities operable upon insertion of said cassette into said receiving means for playing back and recording information thereon, respectively, tape driving means operable upon insertion of said cassette into said receiving means for transporting said tape through said cassette, tape drive control means for changing the speed and direction of movement of said tape through said cassette, cassette eject means for ejecting a cassette inserted into said player-recorder, said eject means being operable to an eject-ready position upon insertion of said cassette into said receiving means and including a holding coil energizable to maintain said eject means in said eject-ready condition, mode selector means including a control member movable to non-record and record positions and switch means operable from a first to a second condition upon moving said control member from said non-record to said record condition, respectively, said switch means being connected electrically to the holding coil of said eject means and completing an operating circuit therefor upon being operated to said second condition and mode control disengage means coupled to said tape drive control means and said mode selector control member, said mode control disengage means being operable in response to the movement of said tape drive control means to move said mode control member from said record to said non-record position, thereby operating said switch means to said first condition for breaking the circuit to said holding coil, whereby said cassette is ejected from said cassette receiving means.

2. A tape player-recorder as claimed in claim 1 wherein said switch means includes an actuator arm movable from a first to a second position for operating said switch means to said first and second conditions, respectively, wherein said mode selector means includes a cam member mounted on said mode control member engageable with said actuator arm upon moving said control member from said non-record to said record condition for operating said switch means from said first to said second condition, respectively, and means for engaging said cam member and capturing said mode control member in said record position upon moving the latter thereto, and wherein said mode control disengage means includes a disengage cam member coupled to said tape drive control means and movable in response to the operation of said tape drive control means, into engagement with said mode control member engaging means to release said mode control member, thereby to operate said switch means to said first condition to eject said cassette from said receiving means.

3. A tape player-recorder as claimed in claim 2 wherein said tape drive control means includes an arm member movable to first and second positions for driving said tape through said cassette at fast forward and reverse speeds, respectively, wherein said cam member engaging means includes a pivotal arm movable from a first to a second position and resiliently biased into said first portion, said pivotal arm being engaged by said mode selector cam member upon moving said mode control member to said record condition, whereby said pivotal arm is moved to said second position and captures said cam member to maintain said control member in said record condition, and wherein said mode control disengage means includes a block member mounted for pivotal movement and coupled to said tape drive control means for movement in accordance with the movement thereof, one end of said pivotal block member coupled to said tape drive means and the other end thereof coupled to said pivotal arm, whereby upon moving said tape drive control into either of said positions, said disengage cam member engages said pivotal arm to release said mode selector control.

4. A tape player-recorder as claimed in claim 3 wherein said control member comprises a shaft rotatable from a playback to a record-ready position ane vice versa, and subsequent to being rotated to said record-ready position, depressible inwardly against a biasing spring to a record position, wherein said cam member is mounted on said shaft and includes a peripheral lip, wherien said disengage cam member includes a V-shaped cut-out and wherein said pivotal arm includes a projection engageable with the lip on said cam member upon depressing said control shaft to said record position, so that said control shaft is captured in said depressed position, and a pin extending into said V-shaped cut-out normally out of engagement with said disengage cam, said pin being engaged by said disengage cam upon movement of the latter to pivot said pivotal arm for disengagement of the lip of said cam member and said projection, whereby said control shaft is returned to said record-ready position.

5. A tape player-recorder adapted to receive a cassette for recording and playing back information on a tape provided in said cassette, including in combination: tape cassette receiving means, tape palying and recording means operable to playback and record information on said tape upon insertion of said cassette into said receiving means, tape drive means for transporting said tape through said cassette past said tape playing and recording means, tape drive control means for changing the speed and direction of said tape through said cassette, mode selector means including a control member movable to non-record and record positions for operating said tape playing and recording instrumentalities to respective conditions and mode selector disengage means coupled to said mode selector means and said tape drive control means and operable in response to the movement of said tape drive control means to move said mode control member out of said record position and further including cassette eject means for ejecting a cassette inserted into said receiving means therefrom, said eject means being operable to an eject-ready position upon insertion of said cassette into said receiving means and including a holding coil energizable to maintain said eject means in said eject-ready condition, and wherein said mode selector means further includes switch means operable from a first to a second condition upon moving said control member from said non-record to said record condition, respectively, and connected electrically to the holding coil of said eject means for completion of an operating circuit therefor upon being operated to said second condition, whereby said switch means is operated to said first condition in response to the movement of said tape drive control means to break the circuit to said holding coil, so that said cassette is ejected from cassette receiving means.

6. A tape player-recorder as claimed in claim 5 wherein said mode selector means comprises a control shaft mounted for rotation to play and record-ready positions for preparing said tape player and recording means for respective operation, and depressible against the force of a biasing spring mounted on said shaft from the record-ready position to a record position and a cam member mounted on said control shaft, said cam member including radially outwardly extending engaging means, wherein said mode control disengage means includes a disengage cam movable to first and second positions in accordance with the operation of said tape drive control means and interlock arm means movable between first and second positions and being resiliently biased toward said first position, said interlock arm means being mounted for engagement with said disengage cam and including projection means engageable with said radially outwardly extending engaging means of said control cam member for moving said interlock arm means from said first toward said second position, said interlock arm means thereby capturing said control shaft in said record position, and releasing said control shaft from said last-mentioned position upon operation of said tape control means, whereby said control shaft is returned to the record-ready position.

7. A tape player-recorder as claimed in claim 6 wherein said tape drive control means includes an arm movable in first and second opposite directions changing the speed and direction of movement of the tape in said cassette, wherein said mode selector disengage means further includes a block member coupled to said tape drive control arm and pivotal in first and second directions in accordance with the movement of said arm in said first and second directions, respectively, said block member coupled to said disengage cam to move the latter in accordance with the pivotal movement of said block, wherein said disengage cam includes a cut-out formed therein, and wherein said interlock arm means includes second projection means extending into said cut-out, said second projection means being engaged by the side walls of said disengage cam forming said cut-out upon moving said tape drive control arm in either of said first or second directions, thereby to move said interlock arm means toward said second position to permit the movement of said mode control shaft from said record to said record-ready position.

8. A tape player-recorder as claimed in claim 7 wherein said interlock arm is mounted for pivotal movement between said first and second positions and is normally biased resiliently to said first position, wherein said disengage cam is movable in directions substantally at right angles with respect to the directions of movement of said tape drive control arm, and wherein said radially outwardly extending engaging means on said cam member comprises a peripheral lip which upon depression of said control shaft, engages the first-mentioned projection means of said interlock arm to move the latter toward said second position, so that said projection means holds said control shaft in the depressed position against the force of said biasing spring and wherein movement of said interlock arm out of said second position releases said control shaft, whereby said control shaft and interlock arm return to the record-ready and first positions, respectively.

9. In a tape player-recorder adapted to receive a cassette for recording and playing back information on a tape within the cassette, cassette receiving means movable from a ready position to a play-record position, tape playing and recording instrumentalities operable to playback and record modes for playing back and recording information on said tape, respectively, tape driving means operable upon said cassette receiving means being moved to said play-record position for propelling said tape through said cassette, actuator means coupled to and operable to move said cassette receiving means from said ready to said play-record position, said actuator means including an arm movable sidewise to change the speed and direction of said tape driving means for use in the playback condition only, tape cassette eject means operable to an eject-ready condition in response to the cassette receiving means being moved to said play-record position, said tape cassette eject means including holding coil means energizable electrically to maintain said eject means in said eject-ready condition and upon de-energization thereof to release said eject means to return said cassette receiving means to said ready position, mode selector means for placing said tape playing and recording instrumentalities in said playback and record conditions, respectively, said mode selector means comprising control means movable to playback, record-ready and record positions and switch means coupled electrically to said holding coil means and operable from a first to a second condition upon movement of said control means to said record conditions to complete an enabling circuit to said holding coil, mode selector disengage means coupled to said mode selector means and said actuator means, said disengage means operable in response to the sidewise movement of said actuator arm when said mode selector control means is in said record position, to move said mode selector control means out of said last-mentioned position and to operate said switch means from said second to said first condition, thereby breaking the enabling circuit to said holding circuit, whereby said eject means returns said cassette receiving means to said ready position.

10. A tape player-recorder as claimed in claim 9 wherein said mode selector means comprises a shaft rotatable from the playback to the record-ready position and vice versa, and subsequent to being rotated to said record-ready position, depressible against a biasing spring to said record position, wherein said rotatable shaft includes a cam mounted thereon for rotation therewith, wherein said mode selector disengage means includes a disengage cam member coupled to said actuator arm for movement in first and second opposite directions in accordance with the sidewise movement of said actuator arm and a pivotal arm member interposed between said disengage cam member and said cam mounted on said rotatable sahft, said pivotal arm member being movable to said first and second positions and being resiliently biased toward said first position, said pivotal arm member being moved from said first to said second position and engaging and capturing said cam to maintain said control shaft in a depressed position upon moving said mode selector into said last-mentioned position, and being moved from said second to said first position to release said control shaft to return the latter to a record-ready position upon moving said actuator arm in either of said first and second directions.

* * * * *